INVENTOR:
ARTHUR H. KIDD

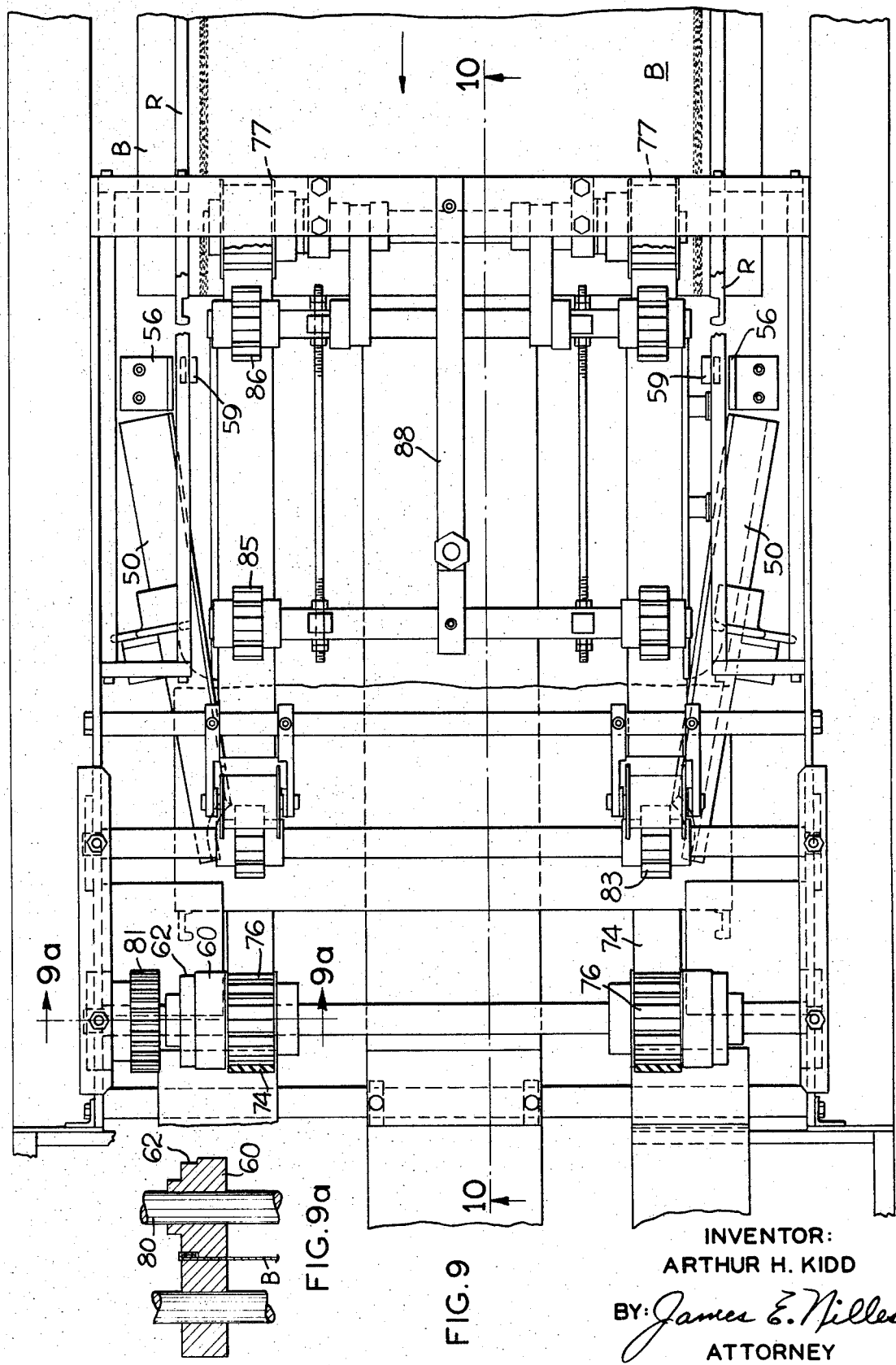

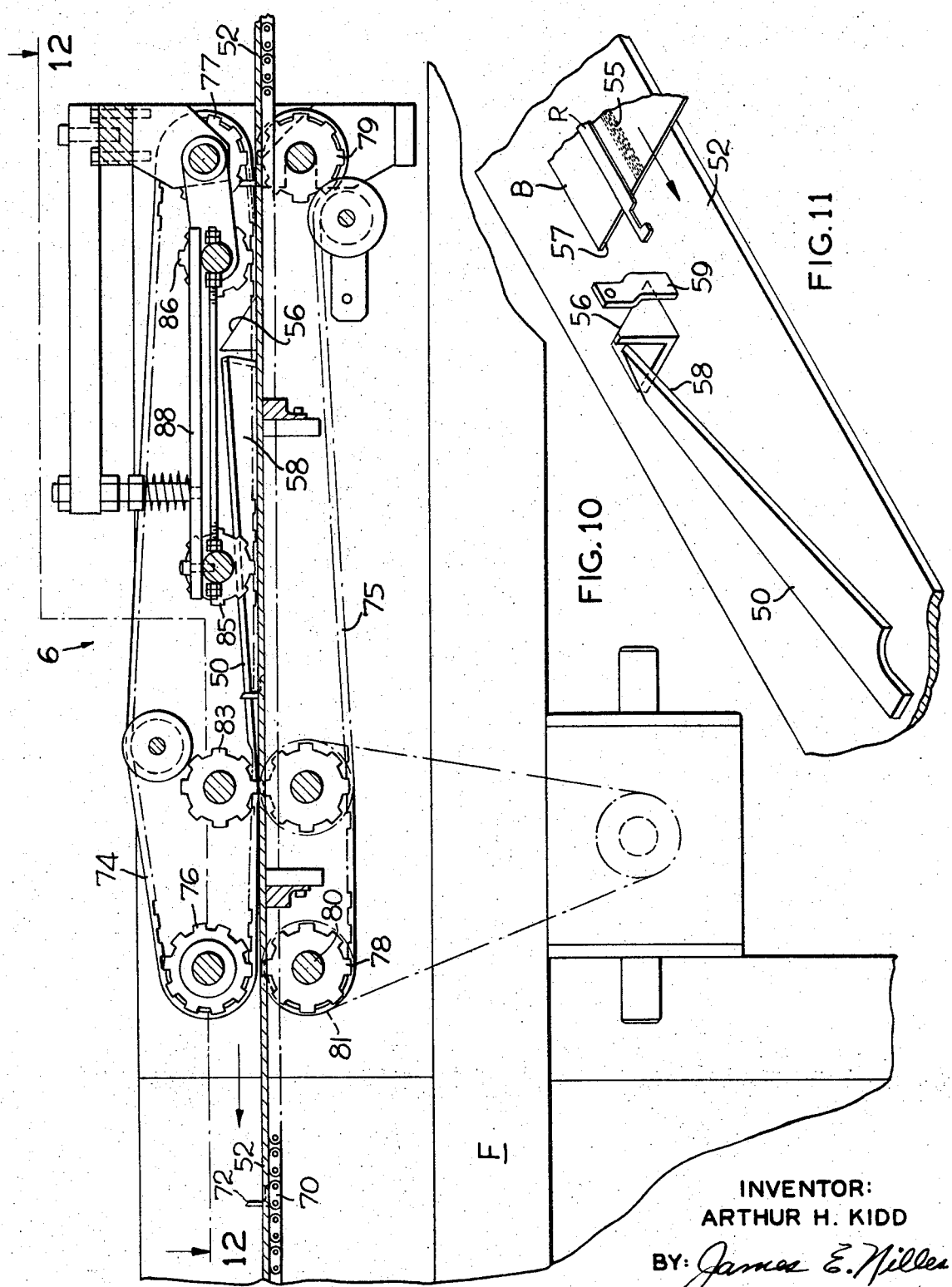

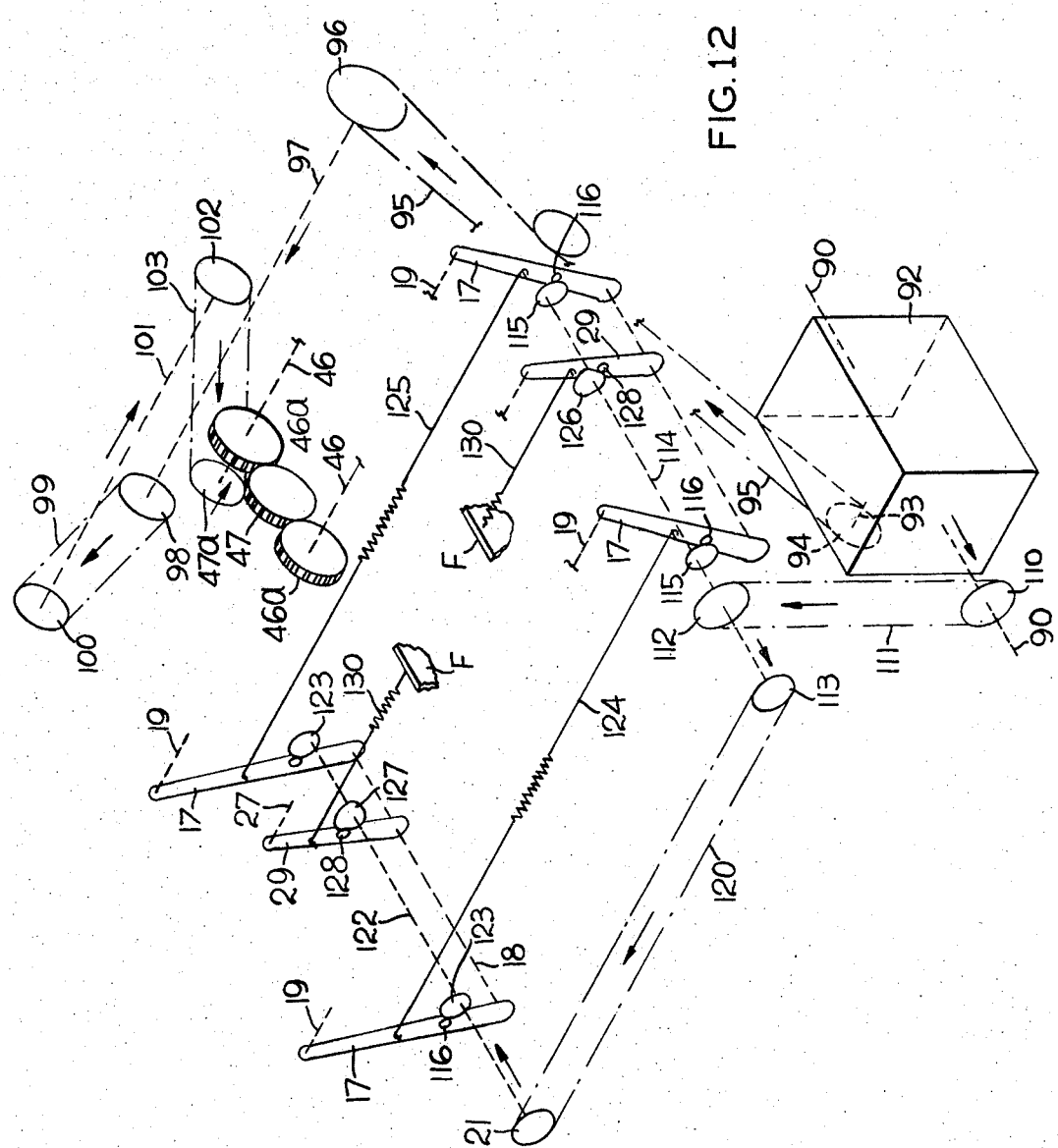

BY: *James E. Nilles*
ATTORNEY

United States Patent Office 3,700,528
Patented Oct. 24, 1972

3,700,528
MACHINE FOR MAKING HANGING
FILE FOLDERS
Arthur H. Kidd, Menomonee Falls, Wis., assignor to
Condes Corporation, Milwaukee, Wis.
Filed June 28, 1971, Ser. No. 157,181
Int. Cl. B31f 1/00
U.S. Cl. 156—475                            16 Claims

ABSTRACT OF THE DISCLOSURE

A machine for applying a support rod along opposite edges of a paperboard blank or the like in which the rod is glued to the blank and edges of the blank are then folded over the rod and glued thereover. The machine includes means for transferring the rods from a magazine and to a precise position on a glue pattern of the blank, and the machine also includes an edge turning means for the blank whereby the longitudinal edge of the blank is folded over the glued rod and firmly pressed into contact therewith.

BACKGROUND OF THE INVENTION

The invention relates to machines for converting paper blanks into file folders of the type which are adapted to be hanging and supported along their longitudinal edges in a suspension rack.

Generally file folders of this character have been assembled in many instances by hand. Certain attempts have been made to mechanize this work, but have proved not to be entirely satisfactory because of malfunction of the machine and the considerable maintenance required thereby, and furthermore, because of the lack of a fully automated machine which could perform at high speeds and without break-down.

SUMMARY OF THE INVENTION

The present invention provides a machine for making hanging file folders wherein blanks are passed successively along a longitudinal path through the machine. A particular glue pattern is applied adjacent the longitudinal and opposite edges of the blank, the support rods are furnished from a magazine at each side of the blank and transferred and deposited precisely along the glue pattern on each side of the blank, and longitudinal edges of the blank are then folded over the rods and pressed firmly into contact with the glue, all of the necessary parts for performing the operations being in timed sequence with one another.

The machine provided by the present invention for making hanging file folders is completely automatic in operation, and is capable of making such folders at a very rapid rate.

These and other objects and advantages of the present invention will appear hereinafter as this disclosure progresses, reference being had to the accompanying drawings.

BRIEF DESCRIPTION OF THE DRAWINGS

FIG. 1a is a fragmentary, plan view of the stationary table of the flap folding station and showing a portion of the conveying means for conveying the blank thereover;

FIG. 3a is a fragmentary perspective view of other of the parts of the upper portion of the FIG. 3 device;

FIG. 9 is a plan view of the flap folding station as shown in FIG. 1, but on an enlarged scale and with certain parts being shown as broken away, in section, or removed for the sake of clarity;

FIG. 9a is a section view taken along line 9a—9a in FIG. 9 and showing the presser roller;

FIG. 10 is a vertical, sectional view through the conveying mechanism of the flap folding station, the view being taken generally along the line 10—10 in FIG. 9 and certain parts being shown as broken away for the sake of clarity;

FIG. 11 is a perspective and fragmentary view of a blank with a rod placed on its glued portion and as the blank approaches the plow which turns the edge of the blank over the rod for contact with another glued portion, the plow shown in FIGS. 9 and 10, and in FIG. 1;

FIG. 12 is a schematic, perspective view of the drive mechanism of the present invention, the arrows in the view indicating the general direction of power flow through the mechanism;

DESCRIPTION OF A PREFERRED EMBODIMENT

General

Figure 1:
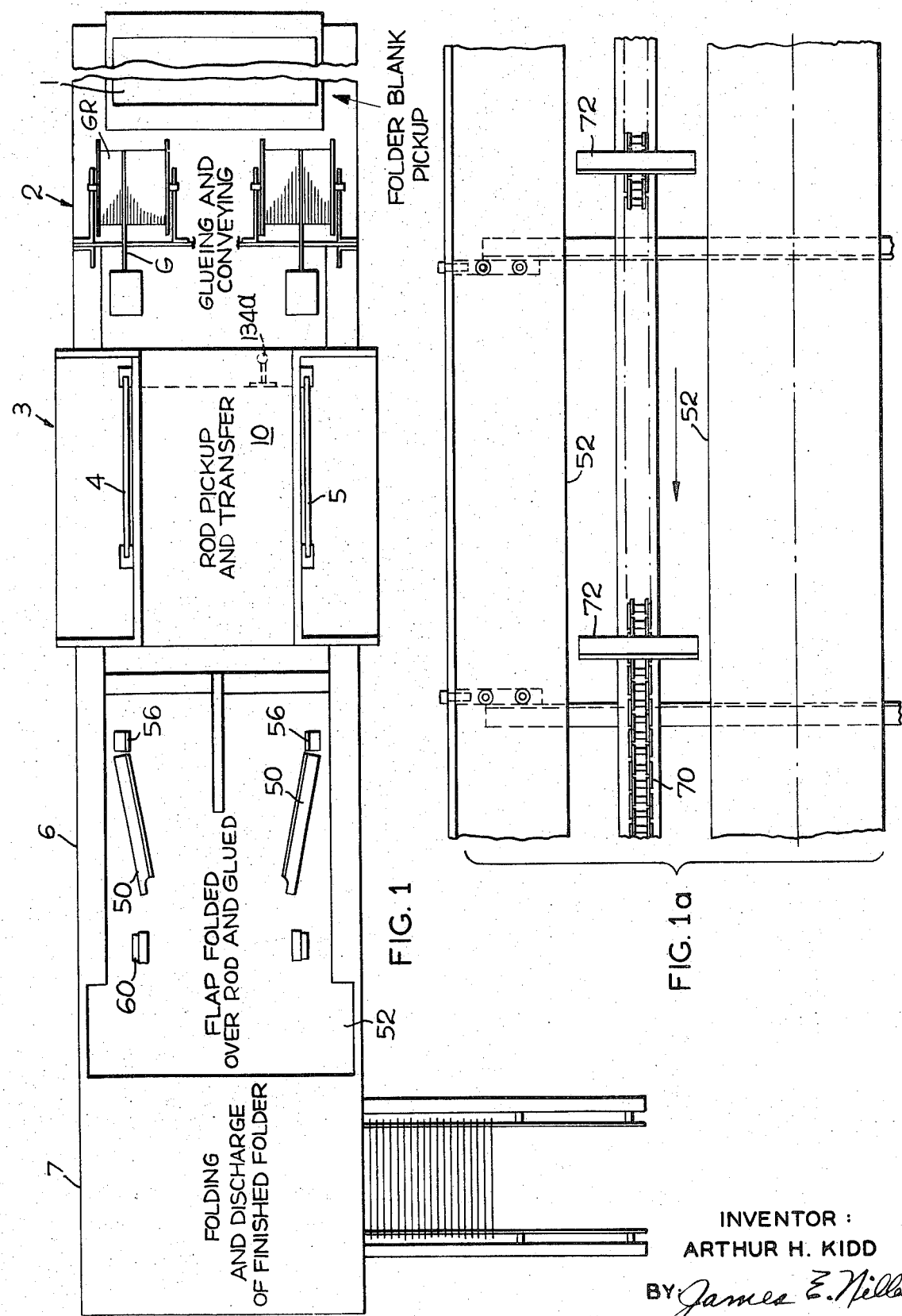
FIG. 1 is a schematic plan view of a machine for assembling a hanging file folder and which embodies the present invention.

The general arrangement of the machine which incorporates the present invention is shown in FIG. 1 and includes a supply of folder blanks 1 at the right hand side of the machine. These blanks are individually fed through a gluing and conveying station 2 where strips of glue are applied from rotatably mounted glue rolls GR along each longitudinal edge of the blank, the pattern of the glue being shown generally at 30 and 55 on the blank B in FIG. 3.

The blank with the glue thereon then moves into the rod pick up and transfer station 3 where rods are removed from the rod magazines 4 and 5, one of each side of the blank and deposited by means to be described on part of the glued pattern of the blank, and at each side of the blank. At this station the rod is pressed firmly on the glue pattern and the blank with the rod in is then moved to the flap folding station 6 where the edges of the blank are turned inwardly over the adjacent rods and pressed firmly into contact with the remainder of the glue pattern.

After the turned over flap has been firmly pressed onto the glue pattern, the blank with the assembled rods then passes to the folding and discharge station indicated generally at 7 in FIG. 1.

Rod pick-up and transfer means

Referring now in more detail to the rod pick up and transfer station 3, and particularly FIGS. 2 to 7 inclusive, the main frame F of the machine has various steel members welded together and to which the various parts of the machine are mounted and certain drive shafts to be described are suitably journalled. A stationary, horizontal table means 10 is supported by the main frame and it is over this table 10 that the blank B moves and is supported as it passes through the station 3.

Mounted on either side of the table are rod magazines 4 and 5 which are adapted to hold a vertical stack of rods R which are to be applied to opposite longitudinal edges of the blank. These magazines generally comprise two vertically spaced and parallel members which embrace the ends of the rod and permit the rods to be lowered by gravity as the lowermost rod is removed from the magazine by means to be described. Thus, a continuous supply of rods are provided at each side of the blank at the rod pickup station 3.

Means are provided for removing the lowermost rod from each of the magazines 4 and 5 and shifting the rods inwardly towards the center of the machine where they can be subsequently placed adjacent opposite edges of the blank. The means for shifting the rod is shown as a pair of reciprocating slides 14 which reciprocate in their guideway 15 and have a notched portion 16 at their inner ends. The notched portion 16 picks up a lowermost rod R from the magazine and the pairs of slides 14 are then pushed towards the center of the machine by swinging movement of the arms 17 about the shaft 18 on which they are journalled. The adjustable turnbuckles 19 are pivoted to the upper end of arms 17 and are also pivoted to the slide 14 as at 20.

Figure 3:
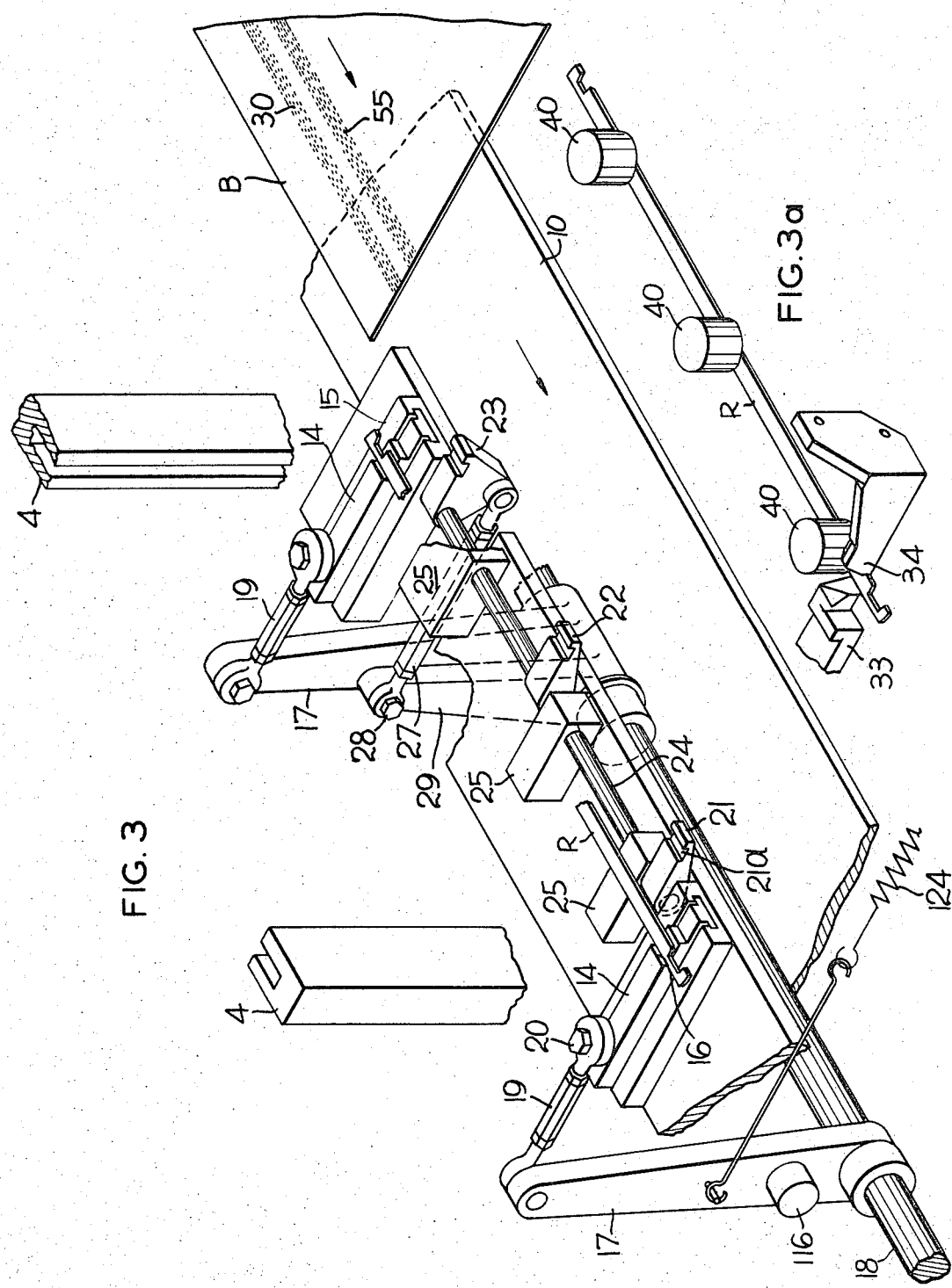
FIG. 3 is a fragmentary, perspective view with parts broken away or in section, of certain parts of the upper portion of the rod pick up and transfer station as shown in FIG. 2.

It will be understood that a pair of these arms 17 are provided at each side of the machine for reciprocating their respective slides 14 in unison to thereby pick the lowermost rod R from their magazine and move it bodily over the blank B which, as viewed in FIG. 3, is approaching in the direction indicated by the arrow.

The slides thus move the rods from the magazine inwardly, which motion positions the rod lengthwise in the end guide 20 (FIGS. 2, 6, and 7) over the blank and deposits the rods on positioning means in the form of three aligned and swingable supports arms 21, 22 and 23. More specifically, the rod is deposited in the notches 21a, 22a, 23a of the arms 21, 22 and 23, respectively, the rod is thus accurately positioned and supported by the arms, and the slides 14 then are reciprocated away from the center of the machine and to their original position where the notches 16 can then engage the lowermost rod in the magazine for the next cycle.

It will be noted that the arms 21, 22 and 23 are rigidly secured to a shaft 24 which in turn is oscillatably mounted in the stationary bearing blocks 25. The arm 23 has a connecting link 27 which is also pivotally connected at 28 to the upper end of a shorter arm 29. The shorter arm 29 is journalled on shaft 18 (FIG. 5) and oscillation of shaft 18 as will appear, will cause the arm 23 and consequently rod 24 and the other two arms 21 and 22 to swing downwardly so as to permit the rod R to be moved downwardly as will appear and placed directly on the outermost pattern 30 (FIG. 3) of glue.

Means are also provided for positively holding the rod after it has been deposited into the outer ends of arms 21, 22 and 23 and which means then push the rod downwardly through the guides 33, 33a, 34, 34a and into firm contact with the glue pattern 30. This rod holding and applying means which constitutes a transferring means, is shown in FIGS. 2, 3a, 5, 6 and 7 and includes three magnets 40 for each rod to be held. The magnets are mounted on their swingable brackets 41 which in turn are pivoted as at 42 to a vertically shiftable plate 43. The plate 43 is vertically shifted from an upper position shown in FIG. 6 to a lower position shown in FIGS. 3a and 7 where the rod is being pressed on the glued blank. The means for vertically shifting the plate 43 are the pair of arms 45 which are fixed to their shafts 46, the shafts in turn being rotatable in the direction indicated by the curvilinear arrows. Gears 46a are fixed on shafts 46 and are in constant mesh with a central gear 47. A sprocket 47a is fixed to one of the shafts 46, which sprocket will be referred to later. Rotation of the shafts 46 is in timed relationship with the other portions of the rod pick up station, as will appear. The magnet arms 41 are biased to the downward position by their springs 48 acting between arms 41 and the plate 43. An adjustable stop 49 is provided between the magnetic plate 41 and the plate 43 so that the downwardmost position of the magnet can be accurately predetermined. The action of the springs 48 and stop 49 is such that the spring holds the magnet 40 firmly against the rod and pushes it into firm contact with the glue. On the other hand, if an obstruction is encountered, the magnet can swing upwardly against the bias of the spring 48.

Thus the function of the holding magnets 40 is to contact and hold the rods R as soon as they are placed in the grooves at the outer ends of the swingable brackets 21, 22 and 23, and then as the brackets swing downwardly and out of the way of the rods, the magnets are lowered by the swinging movement of the plate 43, thereby moving the rods through their guides 33 and 34 and into firm engagement with the glue 30 of the blank B.

Figure 4:
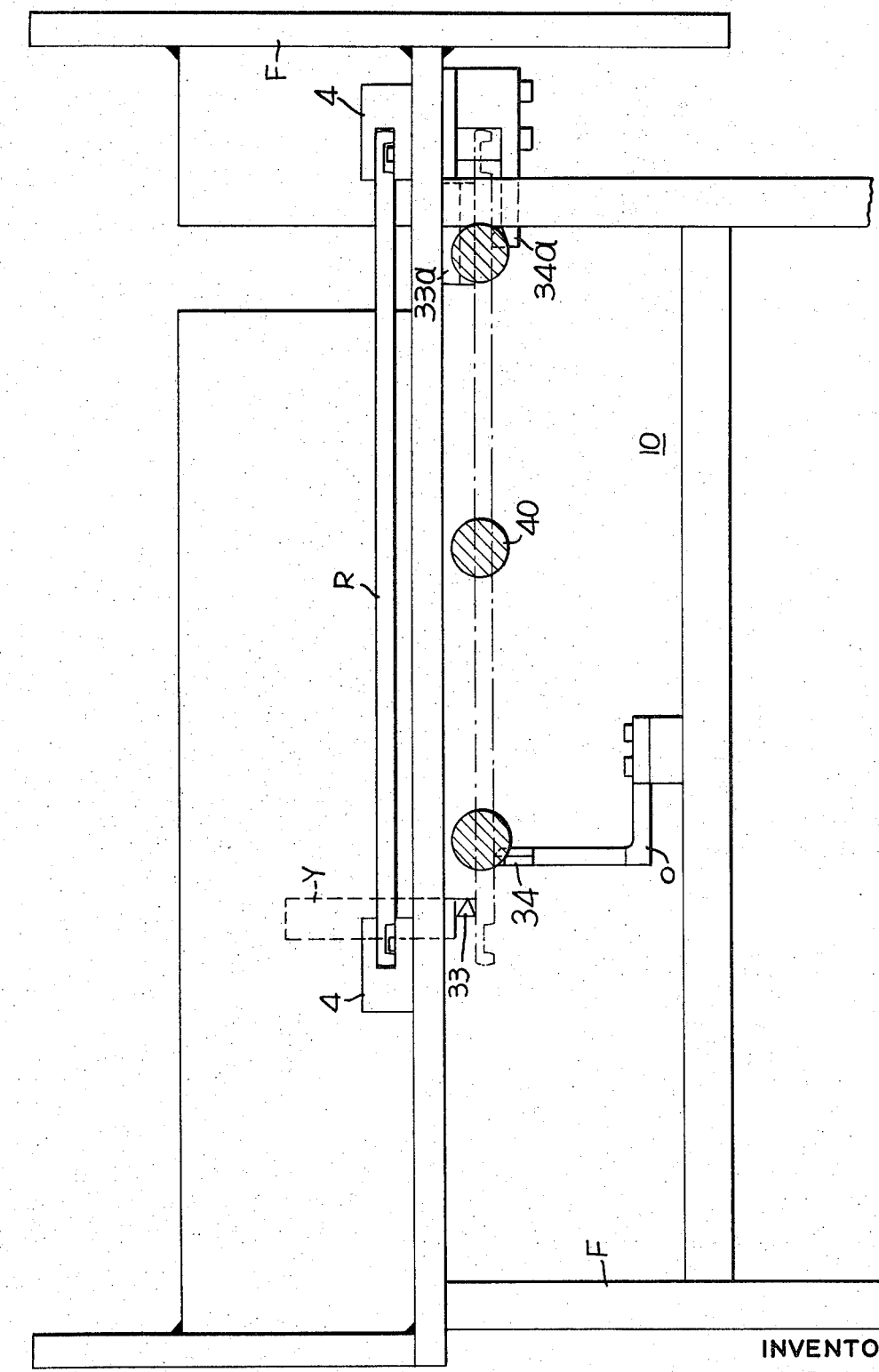
FIG. 4 is a plan view of the device as generally shown in FIG. 3a, and also showing a part of the machine frame.
Figure 5:
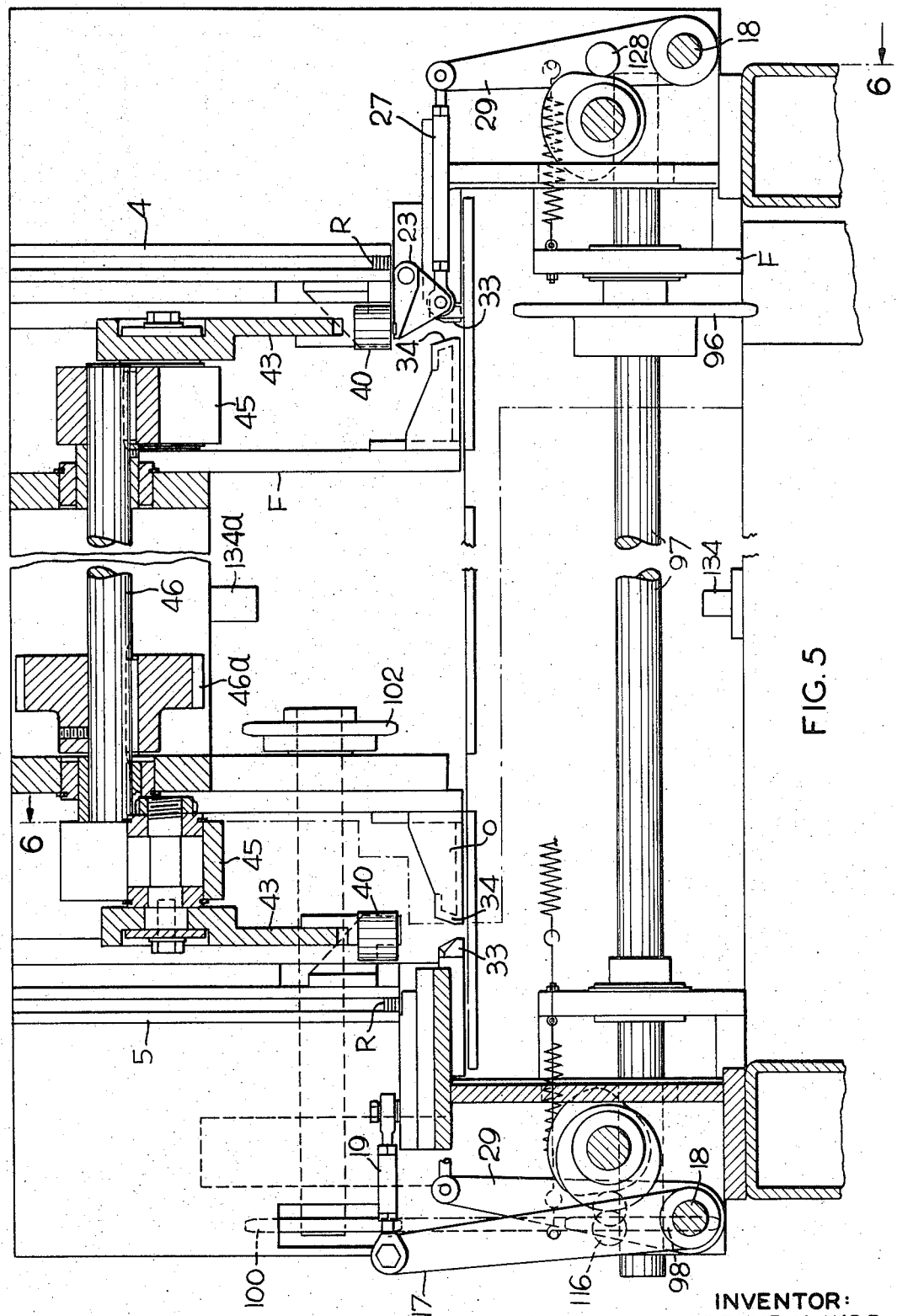
FIG. 5 is a vertical sectional view taken along line 5—5 in FIG. 2.
Figure 6:
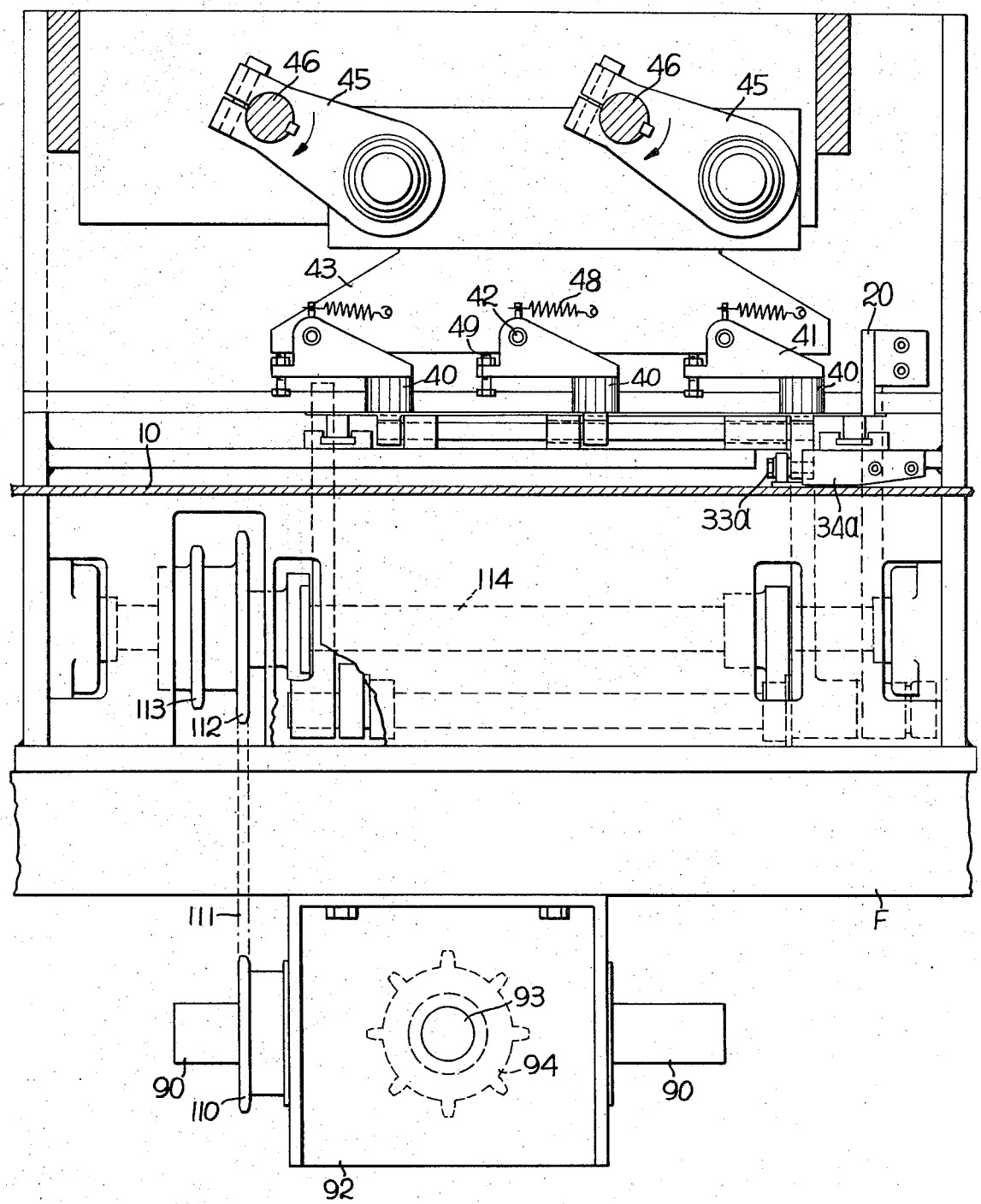
FIG. 6 is a vertical sectional view taken generally along the line 6—6 in FIG. 5 and showing the magnet holding device for the rod in the upper position.
Figure 7:
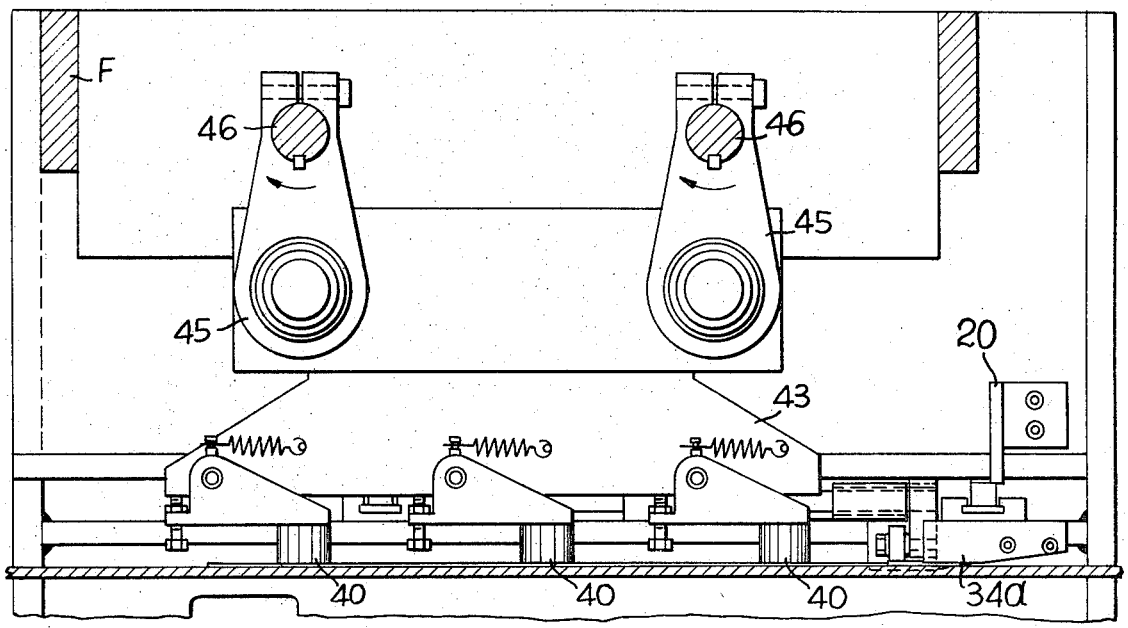
FIG. 7 is a view of a portion of the device as shown in FIG. 6, but showing the magnet holding devices for the rod when moved to a downward position in which the rod is applied to the glued blank.
Figure 8:
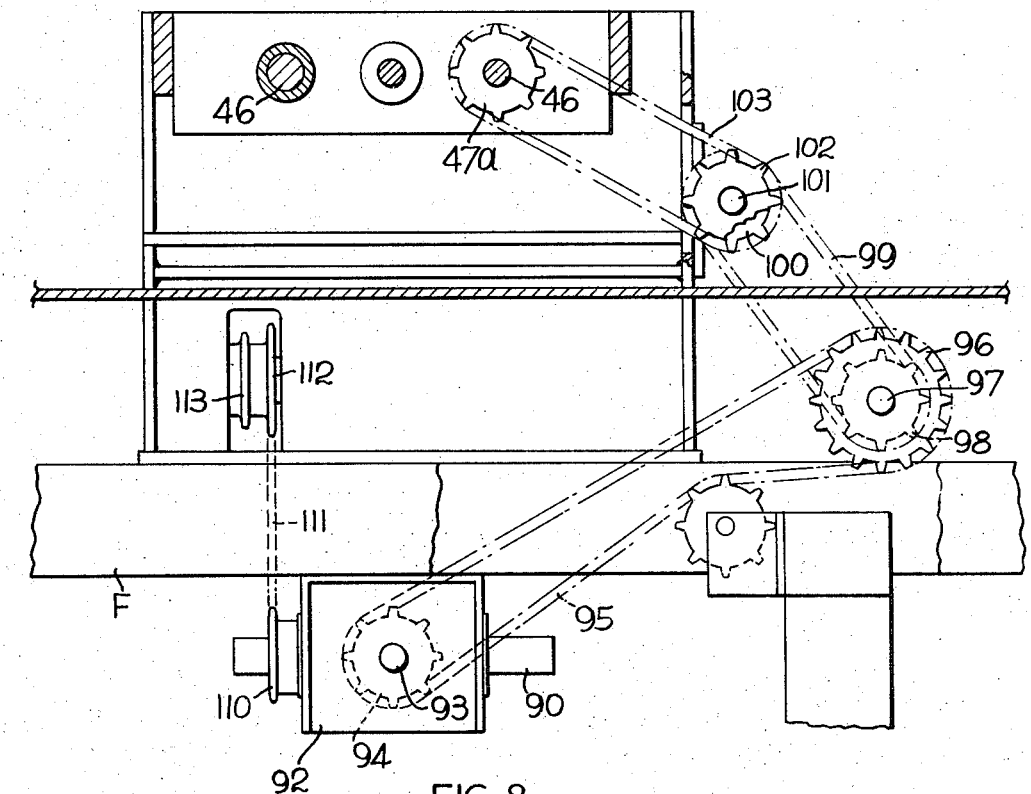
FIG. 8 is an elevational, more or less schematic view of a portion of the drive mechanism, certain parts being shown as broken away or in section for the sake of clarity.

As mentioned, the rod R is guided from the downwardly swinging arms and to the glue pattern 30 by means of the guides 33, 33a, 34, and 34a (FIGS. 3a, 4 and 5). These guides are inclined downwardly so as to receive the rod at their upper, generally wider portions and permit it to slide downwardly onto the blank which in turn is pressed to glue pattern 30.

It will be understood that the individual blanks B are fed in succession from the right end of the machine as shown in FIG. 1 and as the blanks pass through the rod pick up station 3, a rod R is removed from the lowermost portion of the magazine at either side of the station 3 and the rods are then shifted by the slides 14 to a position in which they are received by the swingable arms 21, 22 and 23. The rods are held by the magnets, the arms are then swung downwardly to permitt he rod to be lowered by the magnets and pass through guides 33, 33a, 34, and 34a directly onto the glue pattern 30 which has been deposited along the adjacent each longitudinal edge of the blank B.

Edge folding means

After a rod has been so deposited on opposite sides of the blank B, the blank is conveyed to the blank edge folding station 6. The edge folding station is shown in FIGS. 1, 9, 10 and 11, and includes a pair of plows 50 which are mounted on the top of the table 52 and which are inclined transversely inwardly toward one another in the direction of blank movement. Generally these plows act to turn the outermost edges of the blank B inwardly and over the rod so that the extreme edges of the blank have been longitudinally folded over inwardly where they are then pressed against the second glue pattern 55 that had been previously deposited on the blank at the glue station 2. This folding action is as follows.

As shown clearly in FIG. 11, the plow 50 has a first portion 56 at its entry end which is upwardly inclined so that when the leading edge 57 of the blank engages it, surface 56 acts to raise and turn the edge 57 upwardly to a generally vertical position. The rod slides under the lower end of the stationary hold down finger 59, thereby holding the rod down to prevent its upward movement as the blank edge is turned over the rod. Continued movement of the blank into the second portion 58 of the plow 50.

causes the downwardly and transversely inwardly inclined inner surface portion 58 of the plow to then turn the generally vertically turned edge of the blank over the rod R. When the blank reaches the discharge end of the plow 50, it has been completely turned over the rod and into contact with the second glue pattern 55.

Edge pressing means

Means are then provided for firmly pressing the edge of the blank against the glue pattern 55 and against the rod R so that a good sealed joint is made. This pressing means is shown as roller 60 having a notched edge 62 (FIG. 9a) which complements the shape of the rod and the two layers of the blank which embrace the rod.

Conveying means

As shown clearly in FIGS. 1a, 9 and 10, conveying means are provided for moving the blank along the straight line path above described. This conveying means includes an endless roller chain 70 having transversely arranged and spaced apart flights 71 which protrude above the table 52 and bear against the rear side of the blank for positively moving it along. Opposed, endless belts 74 and 75 are also provided and between which the blank passes and is engaged thereby for positively moving it along. These timing belts 74 and 75 have the conventional internal teeth, the teeth of belt 74 mesh with the pairs of sprocket 76 and 77, and the teeth of belt 75 mesh with sprockets 78 and 79. The shaft 80 on which sprockets 78 are fixed is then driven by spur gear 81 (FIG. 9) at its outer end and as will appear. Suitable idler sprockets 83, 85 and 86 are also provided for the belts so as to maintain them in proper driving relationship with the blank. Furthermore, sprockets 85 and 86 are mounted on the spring loaded arm 88 which biases the tooth rollers 85 and 86 downward thereby pressing the upper belt against the blank for good driving thereof.

The complete blank then passes to the folding and discharge station 7 where the blank is folded along its longitudinal center to complete the hanging file folder.

Drive means

Means are provided for driving the various parts described above in timed relationship with one another as follows, reference being had particularly to FIG. 12.

A power shaft 90 is driven from a power source (not shown) and furnishes power to a gear box means 92. A stub shaft 93 is driven by the gear box means 92 and has a sprocket 94 fixed to its outer end. An endless chain 95 is trained around sprocket 94 and also around sprocket 96 which is fixed to shaft 97 mounted in the frame F. Sprocket 98 is also fixed to shaft 97 and another endless chain 99 is trained around sprocket 98 which is also trained around a sprocket 100 which is fixed to a shaft 101 mounted in frame F. Another endless chain 103 is trained around sprocket 102 and is also trained around the previously mentioned sprocket 47a thereby driving power is provided from the power input shaft 90 to one of the shafts 46 thereby furnishing power to rotate the cranks 45 and consequently raise and lower the magnets 40.

Power is also provided from the drive line 90 via sprockets 110, endless chain 111, and the compound sprocket 112, 113, which is fixed to shaft 114 journalled in the frame F. Shaft 114 has a pair of cams 115 fixed thereto for driving the cam followers 116 mounted on the arms 17.

An endless chain 120 transmits power to sprocket 121 fixed on the shaft 122 at the opposite side of the machine. Cans 123 on shaft 122 then drive the other pair of arms 17 in similar fashion. Springs 124 and 125 connect the oppositely aligned pair of arms together.

The arms 29 are also driven by their respective shafts 114 and 122 by the cams 126 and 127 fixed on these shafts; and which bear against the cam followers 128 on the arms 29.

Springs 130 are secured between the arms 29 and the machine frame and bias the arms against their cams.

Lock-out means for rod transferring means

Figure 2:
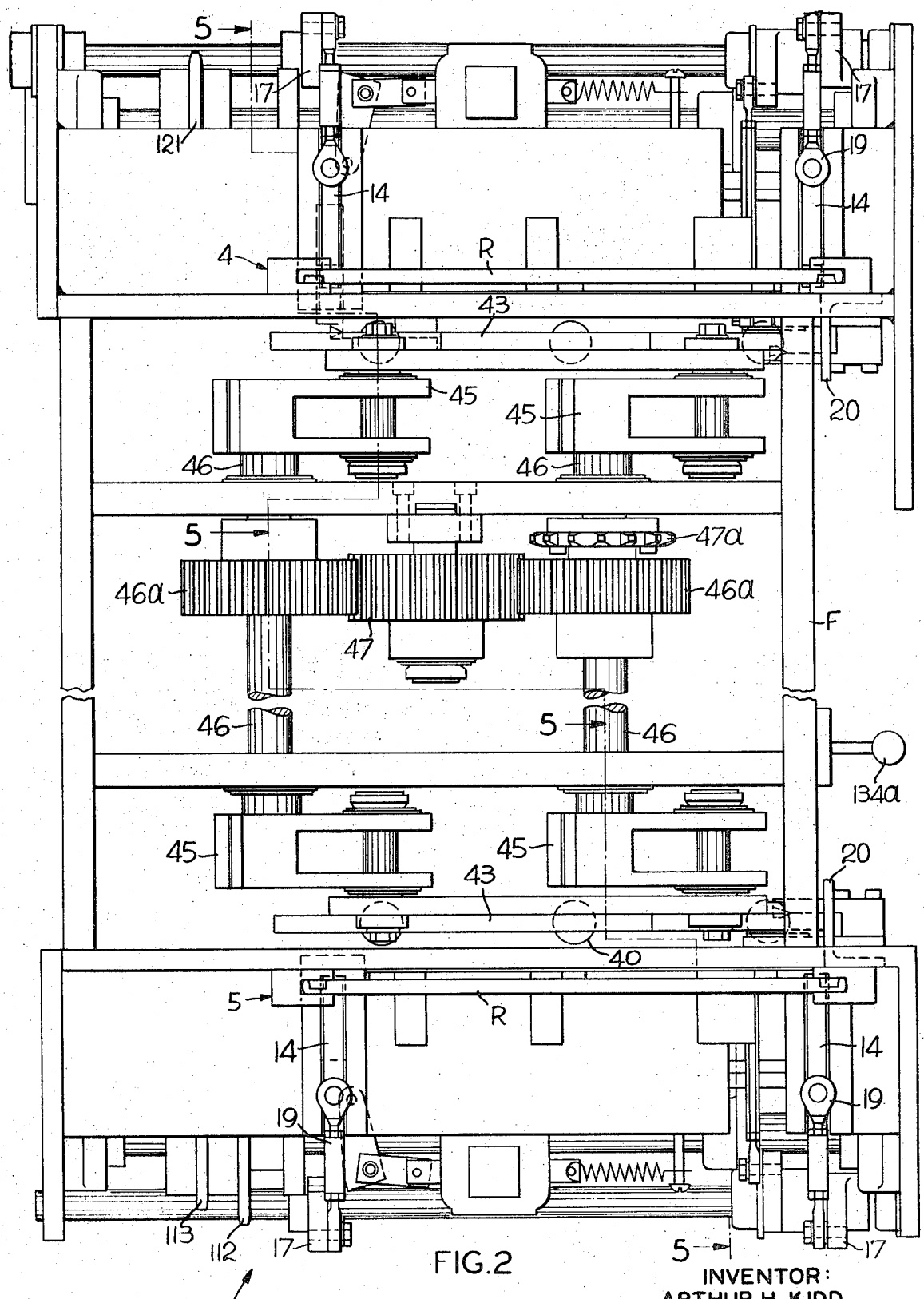
FIG. 2 is a plan view of the rod pick up and transfer station as shown in FIG. 1, certain parts being shown as broken away or removed for the sake of clarity, and the view being substantially enlarged from that of FIG. 1.
Figure 13:
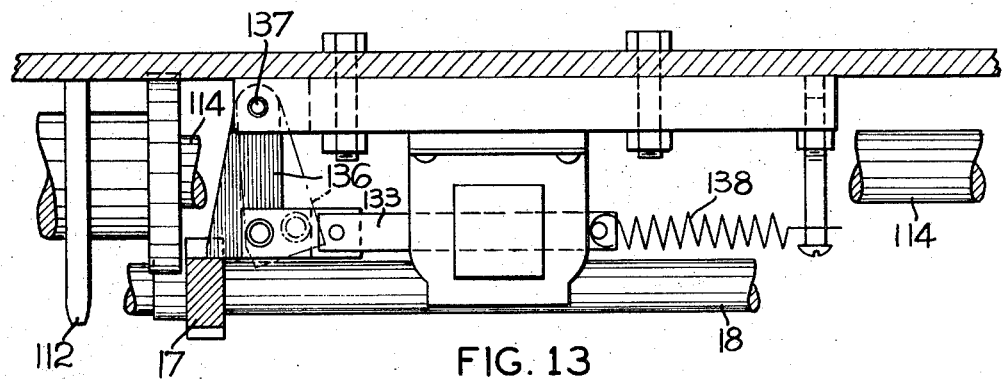
FIG. 13 is a fragmentary plan view, with certain parts in section or broken away for clarity, of the solenoid operated means for locking out the rod transferring means.
Figure 14:
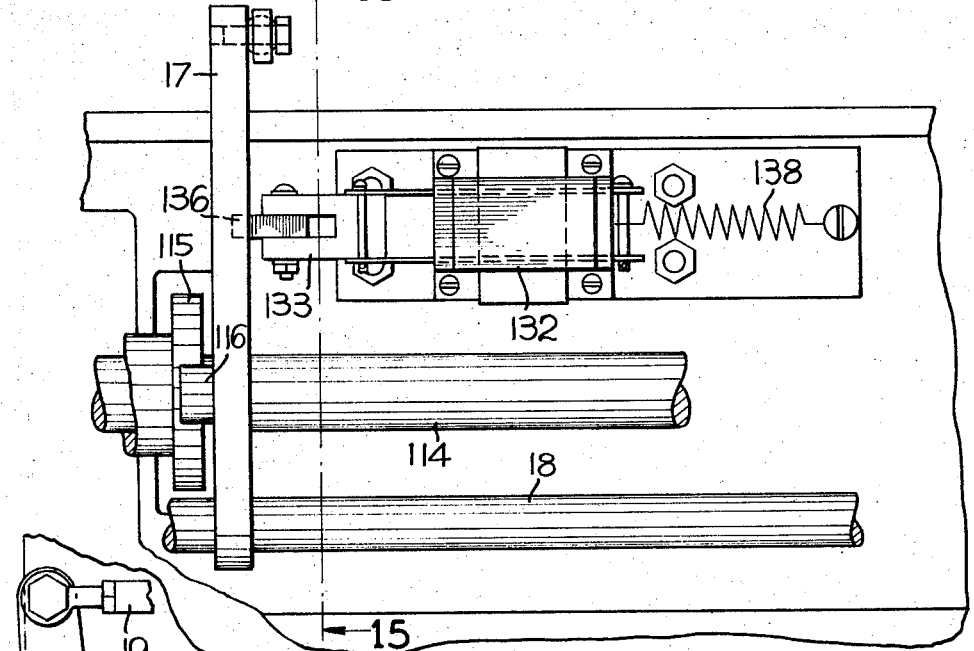
FIG. 14 is an elevational view of the device shown in FIG. 13.
Figure 15:
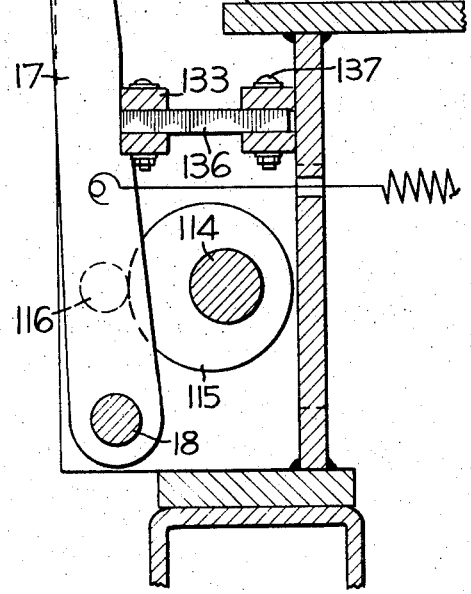
FIG. 15 is a cross sectional view taken generally along the line 15—15 in FIG. 14.

As shown clearly in FIGS. 13 to 15, a solenoid actuated lock-out means is provided for preventing the rod transferring means from transferring the lowermost rod from the magazine to the area where the rods are placed on the blank, in the event that a blank for some reason or another does not arrive at the rod placement position. In the event that for some reason the blank feeder fails to feed a blank through the machine, it is imperative that a rod is not deposited in the blank feed path. For the purpose of preventing this from happening, an electric solenoid 132 having a shiftable plunger 133 is actuated by a photocell 134 and lamp 134a (FIGS. 1, 2 and 5). When a blank does not arrive at the rod placement position, the electric eye photocell is activated which in turn energizes the solenoid 132. This causes the plunger to extend and carry with it the lock-out lever 136 to which it is pivotally attached. The lever 136 is pivoted on the frame at 137 and when the solenoid is energized, the lever 136 is swung to the full line position shown in FIG. 13 where it blocks out and prevents swinging of the actuating arms 17, thereby preventing removal of a rod from the magazine. When the arm 17 is held in the lock-out position, the shaft 114 and its cam continue to rotate without contacting or actuating the arms 17.

When a blank is present in front of the electric eye, the solenoid is de-energized and the solenoid plunger 133 is returned by spring 138 to its withdrawn position, removing the lock-out lever 136 from the path of the swingable arm 17.

I claim:

1. A machine for making a hanging file folder from a blank to which a pair of rods are secured, one adjacent each of opposite edges of the blank, said machine comprising, means for conveying blanks in succession along a longitudinal path, glue applying means for applying glue adjacent and along opposite longitudinal edges of said blanks, a rod holding magazine located generally at opposite sides of said path, rod transfer means adjacent each magazine and shiftable to transfer a rod from a magazine to a position above the glue along said edges of said blank, and blank edge folding means located generally along opposite sides of said path and engageable by the edges of said blank to thereby cause the longitudinal edges of said blank to be folded over said rods and into contact with glue on said blank.

2. The machine set forth in claim 1 further characterized in that said rod transfer means comprises a slideable guide for moving the lowermost rod in said magazine to a position directly over the glue on said blank, magnet means for holding said rod when so moved by said guide and urging said rod against said glue on said blank, and means for driving said guide and magnet means in timed relationship with one another.

3. The machine set forth in claim 2 further characterized in that said magnet means includes magnet holders, magnets carried by said holders, and means resiliently biasing said holders towards a downward direction.

4. The machine set forth in claim 3 including drive means for said magnet means for shifting the latter in a vertical direction, and guide means for guiding said rod onto said glue on said blank as said magnet means is shifted downwardly.

5. The machine set forth in claim 1 including solenoid operated lock-out means for swinging between an inoperative position, and an operative position where said rod transfer means is prevented from operating, and detecting means for actuating said solenoid means, said detecting means being actuated by the failure of the conveying means to convey a blank along said predetermined path.

6. A machine for making a hanging file folder from a blank to which a pair of rods are secured, one adjacent each of opposite edges of the blank, said machine comprising, means for conveying blanks in succession along a longitudinal path, glue applying means for applying glue adjacent and along opposite longitudinal edges of said blanks, a rod holding magazine located generally at opposite sides of said path and for supplying one rod at a time for each of said blank edges, rod pickup and transfer means adjacent each magazine and shiftable to remove a rod from its magazine and transfer the rod to the glue along said edges of said blank, blank edge forming means located generally along opposite sides of said path and engageable by the edges of said blank as the latter moves along said path with said rods on said glue, said folding means being inclined to thereby cause the longitudinal edges of said blank to be folded over said rods and into contact with glue on said blank, and pressing means to press said folded edges firmly against said rod and said glue on said blank.

7. The machine set forth in claim 6 further characterized in that said rod pickup and transfer means comprises, a pair of slideable guides for moving the lowermost rod in said magazine to a position over the glue on said blank, support means for receiving said rod from said guides, magnet means for holding said rod when so held by said support means and urging said rod against said glue on said blank, and means for driving said guides, said support means and said magnet means in timed relationship with one another.

8. The machine set forth in claim 7 further characterized in that said magnet means includes magnet holders, magnets carried by said holders, resilient means for biasing said magnets towards a downward direction, and stops for limiting the downward movement by said resilient means.

9. A machine for making a hanging file folder from a blank to which a pair of rods are secured, one adjacent each of opposite edges of the blank, said machine comprising, means for conveying blanks in succession along a longitudinal path, glue applying means for applying glue adjacent and along opposite longitudinal edges of said blanks, a rod holding magazine located generally at opposite sides of said path, rod transfer means adjacent each magazine and shiftable to transfer a rod from a magazine to the glue along said edges of said blank, said rod transfer means for picking up and moving a rod from said magazine to a position above the glue on said blank, and transferring means for holding and urging said moved rod against said glue on said blank, and means for driving said guide means and transferring means in timed relationship with one another, and blank edge folding means located generally along opposite sides of said path and engageable by the edges of said blank to thereby cause the longitudinal edges of said blank to be folded over said rods and into contact with glue on said blank.

10. The machine set forth in claim 9 further characterized in that said transferring means includes magnet holders, magnets carried by said holders, and means resiliently biasing said holders and their magnets towards said glue on said blank.

11. The machine set forth in claim 10 including drive means for said transferring means for shifting the latter in a vertical direction, and guide means for guiding said rod onto said glue on said blank as said transferring means is shifted downwardly towards said glue.

12. The machine set forth in claim 9 including solenoid operated lock-out means for swinging between an inoperative position, and an operative position where said rod transfer means is prevented from operating, and detecting means for actuating said solenoid means, said detecting means being actuated by the failure of the conveying means to convey a blank along said predetermined path.

13. A machine for making a hanging file folder which is of the type having a rod secured along each of opposite longitudinal side of the folder, said machine comprising, means for conveying blanks in succession along a longitudinal path, glue applying means for applying glue adjacent and along opposite longitudinal edges of said blanks, a rod holding magazine located generally at opposite sides of said path and for supplying one rod at a time for each of said blank edges, rod pickup and transfer means adjacent each magazine and shiftable to remove a rod from its magazine and transfer the rod to the glue along said edges of said blank; and blank edge folding means located generally along opposite sides of said path and engageable by the edges of said blank as the latter moves along said path with said rods on said glue, said folding means having a first portion inclined upwardly to thereby cause the longitudinal edges of said blank to be turned upwardly, and also having a second portion inclined downwardly and transversely inwardly to thereby fold said upwardly turned edge over said rods and into contact with glue on said blank.

14. The machine set forth in claim 13 further characterized in that said rod pickup and transfer means comprises, a pair of slideable guides for moving the lowermost rod in said magazine to a position over the glue on said blank, support means for receiving said rod from said guides, magnet means for holding said rod when so held by said support means and urging said rod against said glue on said blank, and means for driving said guides, said support means and said magnet means in timed relationship with one another.

15. The machine set forth in claim 14 further characterized in that said magnet means includes magnet holders, magnets carried by said holders, resilient means for biasing said magnets towards a downward direction, and stops for limiting the downward movement by said resilient means.

16. The machine set forth in claim 13 including solenoid operated lock-out means for swinging between an inoperative position, and an operative position where said rod transfer means is prevented from operating, and detecting means for actuating said solenoid means, said detecting means being actuated by the failure of the conveying means to convey a blank along said predetermined path.

References Cited
UNITED STATES PATENTS 2,285,447   6/1942   Lichter _____ 156—552 X RALPH S. KENDALL, Primary Examiner D. A. SIMMONS, Assistant Examiner U.S. Cl. X.R.

156—464, 546, 552, 558; 221—212